(12) United States Patent
Marchant et al.

(10) Patent No.: US 9,542,063 B1
(45) Date of Patent: Jan. 10, 2017

(54) MANAGING ALERT THRESHOLDS

(75) Inventors: Kendra Marchant, Arlington, MA (US); Eric S. Lewine, Apex, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/432,184

(22) Filed: Mar. 28, 2012

(51) Int. Cl.
*G06F 3/048* (2013.01)
*G06F 3/0481* (2013.01)

(52) U.S. Cl.
CPC .................................. *G06F 3/0481* (2013.01)

(58) Field of Classification Search
CPC ............... Y10S 715/974; G06F 3/0482; G06F 3/04842; G06F 3/0362; G06F 17/30398; G06F 17/30451; G06F 1/1692; G06F 1/165; G06F 3/303548; G06F 3/04847; G06F 17/30138; G06F 12/0871; G06F 3/0631; G06F 3/0644; G06F 3/0653; G06F 3/04812; H04L 41/22; H04L 43/045; H04L 12/2631
USPC ........ 715/808, 809, 833, 855, 736, 771, 772
See application file for complete search history.

(56) References Cited

U.S. PATENT DOCUMENTS

| | | | |
|---|---|---|---|
| 5,615,347 A * | 3/1997 | Davis et al. .................... | 715/833 |
| 5,694,610 A * | 12/1997 | Habib et al. ................... | 715/210 |
| 5,960,451 A * | 9/1999 | Voigt ..................... | G06F 3/0605 360/902 |
| 6,006,016 A * | 12/1999 | Faigon ................. | G06F 11/2252 714/26 |
| 6,204,846 B1 * | 3/2001 | Little et al. ..................... | 715/784 |
| 6,466,235 B1 * | 10/2002 | Smith et al. ................... | 715/771 |
| 6,654,803 B1 * | 11/2003 | Rochford et al. ............ | 709/224 |
| 6,750,889 B1 * | 6/2004 | Livingston ..................... | 715/833 |
| 6,850,254 B1 * | 2/2005 | Banning et al. ............... | 715/784 |
| 6,901,582 B1 * | 5/2005 | Harrison ........................ | 717/127 |
| 6,922,816 B1 * | 7/2005 | Amin et al. .................... | 715/833 |
| 7,085,994 B2 * | 8/2006 | Gvily ............................. | 715/234 |
| 7,356,770 B1 * | 4/2008 | Jackson ......................... | 715/736 |
| 7,424,686 B2 * | 9/2008 | Beam et al. ................... | 715/810 |
| 7,523,412 B2 * | 4/2009 | Jones et al. .................... | 715/787 |
| 7,743,340 B2 * | 6/2010 | Horvitz ................ | G05B 19/404 715/710 |
| 7,779,368 B2 * | 8/2010 | Wichelman et al. ......... | 715/833 |
| 8,086,970 B2 * | 12/2011 | Achtermann et al. ........ | 715/833 |
| 8,122,368 B2 * | 2/2012 | Chakra et al. ................ | 715/772 |
| 8,359,547 B2 * | 1/2013 | Akifusa et al. ............... | 715/833 |
| 8,386,951 B2 * | 2/2013 | Tallman ......................... | 715/771 |
| 8,392,845 B2 * | 3/2013 | Cahill et al. ................... | 715/771 |
| 8,489,990 B2 * | 7/2013 | Radloff et al. ................ | 715/721 |
| 2003/0063130 A1 * | 4/2003 | Barbieri et al. .............. | 345/833 |
| 2003/0112269 A1 * | 6/2003 | Lentz ................... | G06F 3/04847 715/738 |
| 2004/0078461 A1 * | 4/2004 | Bendich .............. | G06F 11/3495 709/224 |
| 2005/0102631 A1 * | 5/2005 | Andreas et al. .............. | 715/772 |
| 2006/0095705 A1 * | 5/2006 | Wichelman ........... | G06F 3/0605 711/171 |
| 2006/0150122 A1 * | 7/2006 | Hintermeister et al. ...... | 715/833 |
| 2006/0236248 A1 * | 10/2006 | Eischeid et al. .............. | 715/751 |

(Continued)

*Primary Examiner* — Maryam Ipakchi
(74) *Attorney, Agent, or Firm* — Krishnendu Gupta; John T. Hurley

(57) ABSTRACT

A method is used in managing alert thresholds. An integrated slider settings dialog is provided. An existing setting for the severity of an alert threshold is displayed by the dialog. A user is allowed to view and change the setting for the severity of the alert threshold by hovering over a slider thumb.

18 Claims, 6 Drawing Sheets

(56) References Cited

U.S. PATENT DOCUMENTS

| | | | |
|---|---|---|---|
| 2008/0120565 A1* | 5/2008 | Stiso | G06F 3/04847 715/771 |
| 2008/0201663 A1* | 8/2008 | Etgen | 715/833 |
| 2008/0244437 A1* | 10/2008 | Fischer | 715/772 |
| 2008/0270933 A1* | 10/2008 | Straw | G06F 3/0481 715/781 |
| 2009/0064143 A1* | 3/2009 | Bhogal et al. | 718/100 |
| 2009/0210821 A1* | 8/2009 | Omiya | 715/808 |
| 2009/0235198 A1* | 9/2009 | Migos et al. | 715/780 |
| 2009/0293019 A1* | 11/2009 | Raffel et al. | 715/833 |
| 2009/0300173 A1* | 12/2009 | Bakman | G06F 11/008 709/224 |
| 2009/0303188 A1* | 12/2009 | Triplett | 345/173 |
| 2010/0005420 A1* | 1/2010 | Schneider | 715/833 |
| 2010/0031157 A1* | 2/2010 | Neer et al. | 715/738 |
| 2010/0073160 A1* | 3/2010 | Gilmour et al. | 340/540 |
| 2010/0082505 A1* | 4/2010 | Hollingsworth | G06F 11/328 706/11 |
| 2010/0306694 A1* | 12/2010 | Conzola et al. | 715/786 |
| 2011/0010656 A1* | 1/2011 | Mokotov | G06F 3/0481 715/780 |
| 2011/0282630 A1* | 11/2011 | Rikkola et al. | 702/184 |
| 2012/0004947 A1* | 1/2012 | Dombrowski et al. | 705/7.29 |
| 2012/0030626 A1* | 2/2012 | Hopkins et al. | 715/833 |
| 2012/0079414 A1* | 3/2012 | Eischeid et al. | 715/781 |
| 2012/0124503 A1* | 5/2012 | Coimbatore et al. | 715/772 |
| 2013/0019197 A1* | 1/2013 | Brugler et al. | 715/772 |
| 2013/0042200 A1* | 2/2013 | Armitage | 715/780 |
| 2013/0061177 A1* | 3/2013 | Santos-Gomez | 715/825 |

* cited by examiner

FIG. 3

MANAGING ALERT THRESHOLDS

BACKGROUND

1. Field of the Invention

The present invention relates to managing alert thresholds.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In a typical storage environment comprising multiple servers coupled to one or more storage units (either physical storage units or logical storage units such as volumes), an administrator administering the environment has to perform several tasks to ensure availability and efficient accessibility of data. In particular, an administrator has to ensure that there are no outages due to lack of availability of storage space for any server, especially servers running critical applications. The administrator thus has to monitor space utilization for the various servers. Presently, this is done either manually or using software tools that generate alarms/alerts when certain capacity thresholds associated with the storage units are reached or exceeded.

SUMMARY OF THE INVENTION

A method is used in managing alert thresholds. An integrated slider settings dialog is provided. An existing setting for the severity of an alert threshold is displayed by the dialog. A user is allowed to view and change the setting for the severity of the alert threshold by hovering over a slider thumb.

BRIEF DESCRIPTION OF THE DRAWINGS

Features and advantages of the present invention will become more apparent from the following detailed description of exemplary embodiments thereof taken in conjunction with the accompanying drawings in which:

FIGS. 2-6 illustrate example user interfaces that may be used with the technique herein.

DESCRIPTION OF EMBODIMENT(S)

Described below is a technique for use in managing alert thresholds. In at least one embodiment of the technique, the technique may be used to help provide an integrated slider settings dialog by which a user can determine an existing setting for the severity of an alert threshold and can change the severity of the alert threshold. In an example implementation of the dialog, the user can see at a glance on a bar graph the severity of the alert threshold and can change it simply by hovering over a slider thumb.

Figure 1:
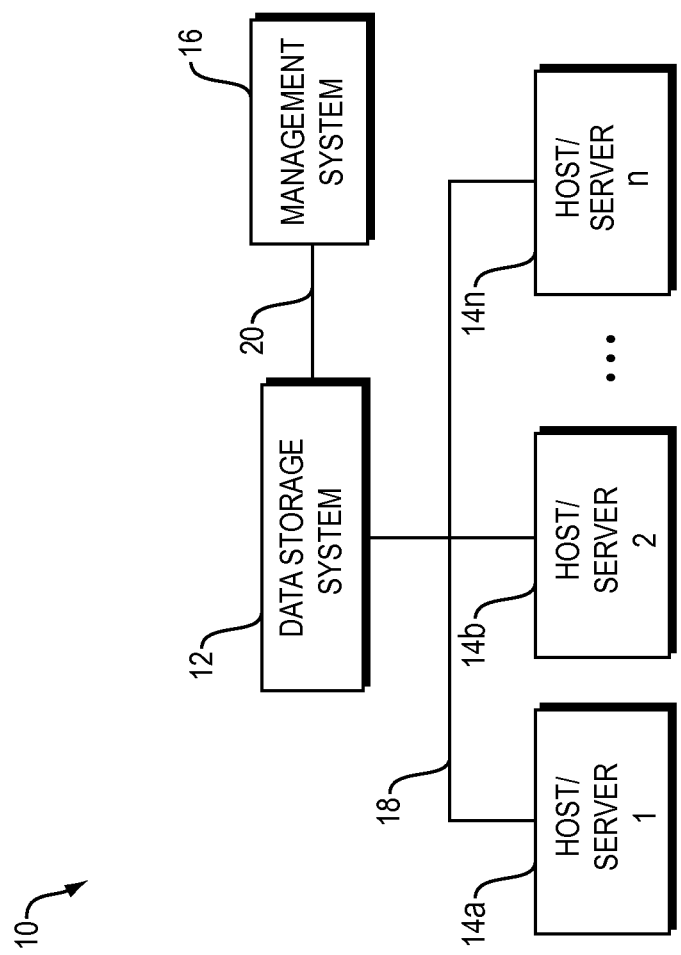
FIG. 1 illustrates an example system that may be used with the technique herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage system 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the internet, an intranet, network or other wireless or other hardwired connection or connections by which the host systems 14a-14n may access and communicate with the data storage system 12, and may also communicate with other components (not shown) that may be included in the computer system 10. In one embodiment, the communication medium 20 may be a local area network (LAN) connection and the communication medium 18 may be an Internet Small Computer System Interface (iSCSI) or fibre channel (FC) connection.

Each of the host systems 14a-14n and the data storage system 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n, the management system 16 and data storage system may all be located at the same physical site, or, alternatively, may also be located in different physical locations. In connection with communication mediums 18 and 20, a variety of different communication protocols may be used such as, e.g., SCSI, FC, and iSCSI. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage system over an iSCSI or fibre channel connection and the management system may communicate with the data storage systems over a separate network connection using TCP/IP. It should be noted that although FIG. 1 illustrates communications between the hosts and data storage system being over a first connection, and communications between the management system and the data storage system being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

The management system 16 may be used in connection with management of the data storage system 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage system 12 may include one or more data storage systems. Each of the data storage systems may include one or more data storage devices, such as disks. One or more data storage systems may be manufactured by one or more different vendors. Each of the data storage systems that may be included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Data storage system 12 may include a plurality of disk devices or volumes. The particular data storage system and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage system 12, and the storage system 12 may also provide data to the host systems also through the channels. The host systems do not address the disk drives of the storage system 12 directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a storage system may be accessed by multiple hosts allowing the hosts to share the data residing therein. An LV or LUN (logical unit number) may be used to refer to one of the foregoing logically defined devices or volumes.

In accordance with an embodiment of the current technique, management system 16 may provide a graphical user interface (GUI) that allows a user to visually monitor, analyze, and configure the system 10.

Referring now to FIGS. 2-5, illustrated are example GUIs, which are in accordance with at least one embodiment of the current technique. In accordance with the embodiment, an integrated slider dialog for choosing and displaying alert severity is now described that may be useful in many cases including for example, in the following use case involving a Senior Storage Administrator and Junior Storage Administrators.

In the use case, the Senior Storage Administrator intends to know when Junior Storage Administrators have allocated a large percentage of storage, and the system allows the Senior Storage Administrator to set and modify a notification With respect to benefits, in accordance with at least one embodiment of the current technique, a popup dialog triggered on thumb mouseover presents alert threshold severity choices. It improves the user experience by:

Providing guidance to the user in showing the user additional values the user can change that the user may not have known about. A second version of the dialog shows how all threshold settings may be incorporated into this dialog.

Displaying at a glance the severity chosen for a threshold. Multiple thumbs may also be incorporated on the same scale; this allows the user to visually (and quickly) determine the severity for each threshold.

The dialog itself eliminates standard dialog buttons (apply, cancel, ok, X) and instead uses the hover and slide off interactions to make the dialog appear and close. It uses the thumb slider and the page Apply button, which makes it lighter weight and integrated.

Figure 2:
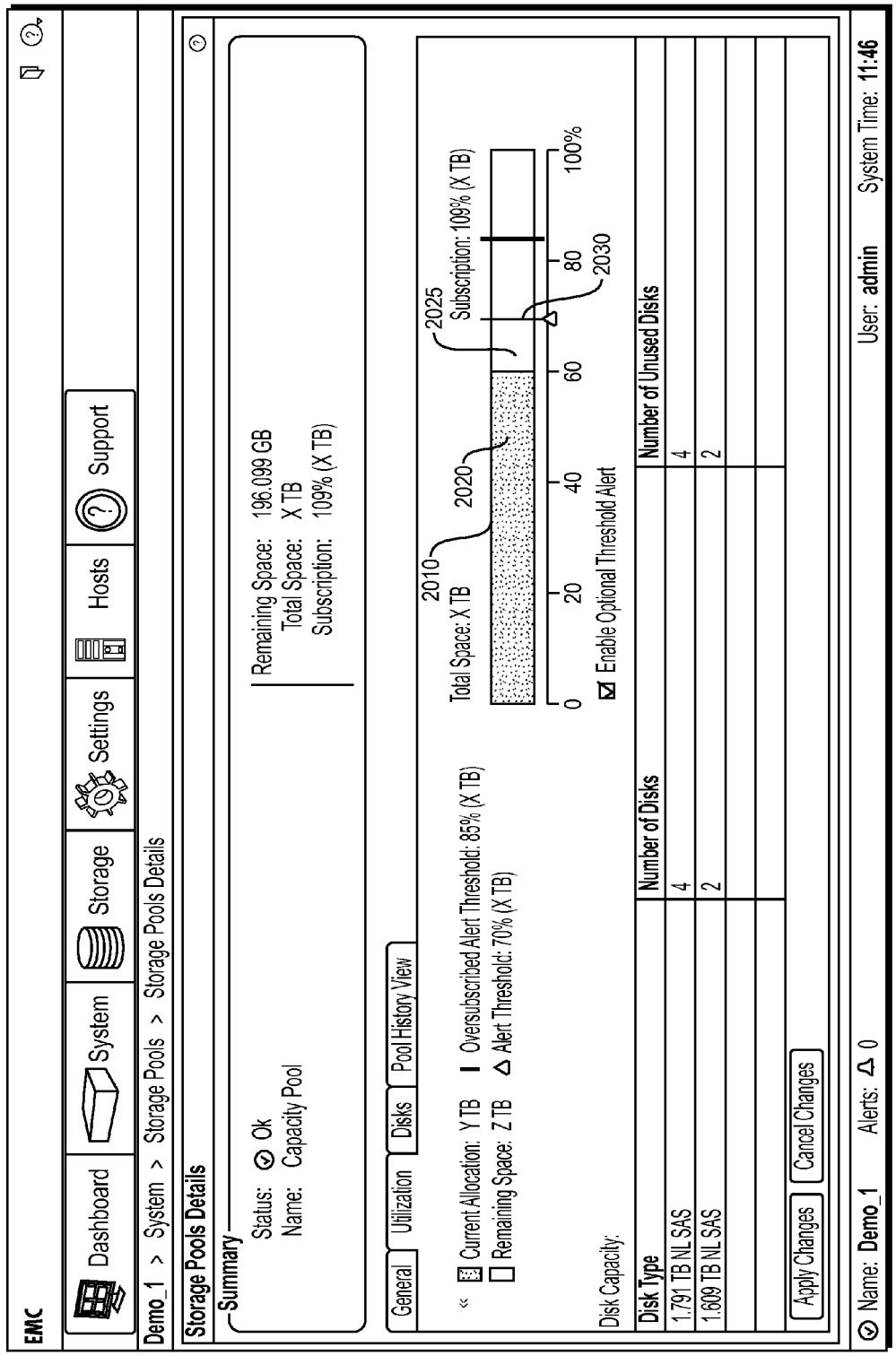

FIG. 2 illustrates a standard GUI without an integrated slider dialog. Utilization bar 2010 is divided between current allocation area 2020 and remaining space area 2025, and has slider 2030 indicating an alert threshold.

Figure 3:
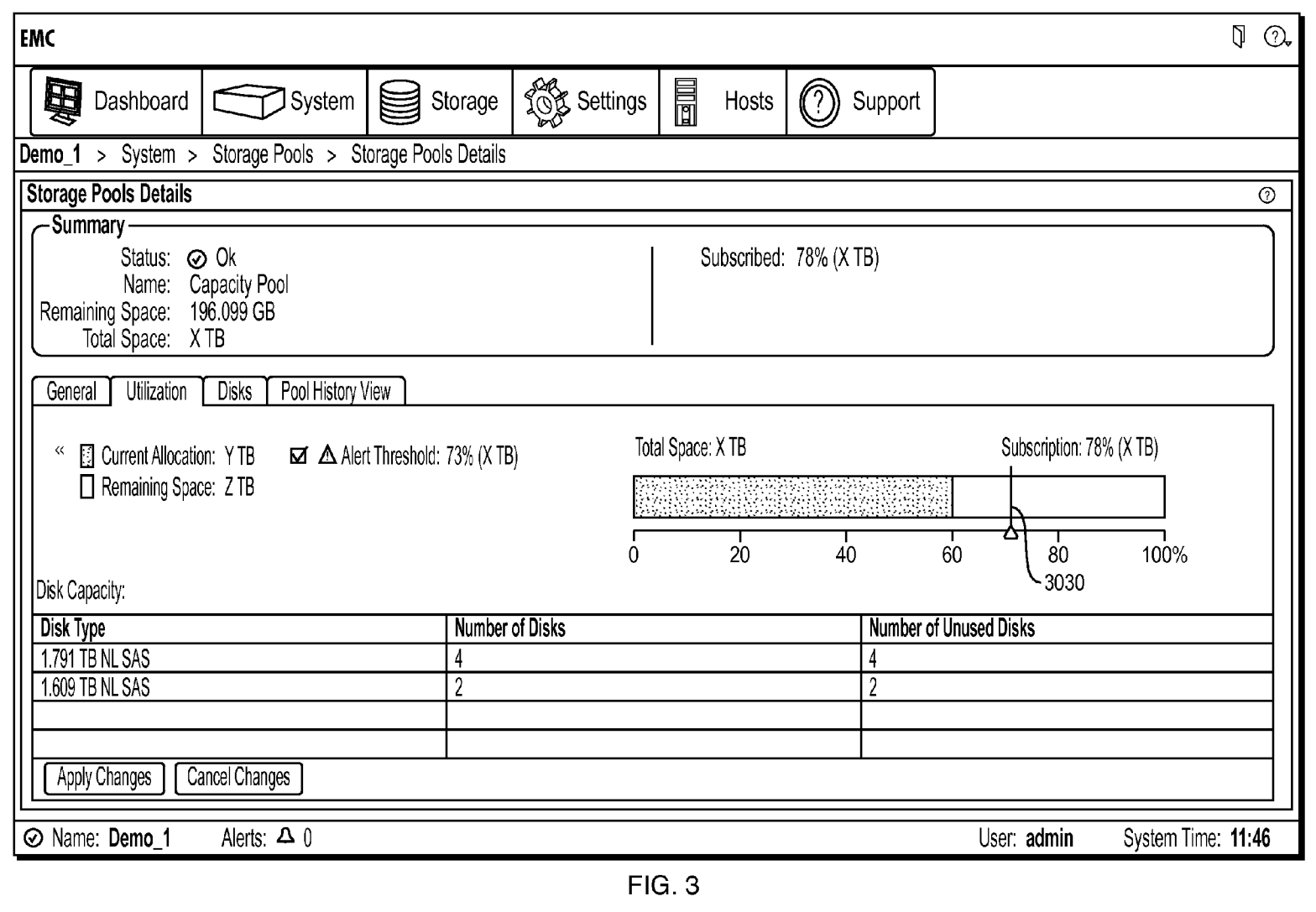

FIG. 3 illustrates an enhanced GUI having an enhanced slider 3030. Example task flows are now described.

With reference to FIG. 3, in accordance with slider 3030, the user already has an alert threshold configured at 73%; when current allocation reaches 73%, the user will receive an email warning the user of this.

Figure 4:
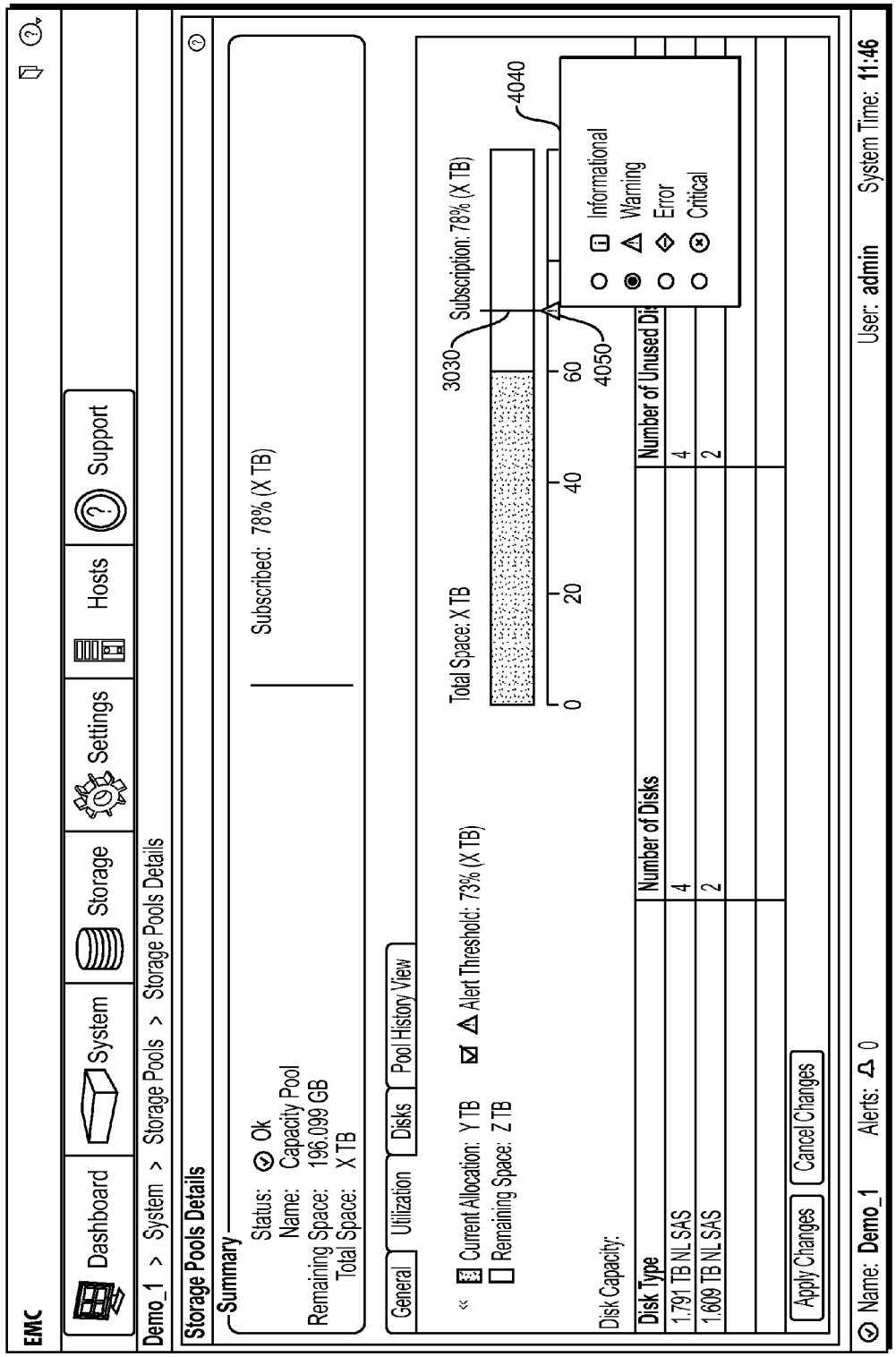

With reference to FIG. 4, the user decides to change the 73% alert threshold so that the user will receive a warning alert when the current allocation reaches a value of 65%, e.g., because the user's administrators are using up storage more quickly than the user anticipated. The user hovers the cursor over warning thumb 4050 on slider 3030, ready to drag slider 3030 to the left, when integrated slider dialog 4040 appears. The user is thereby made aware that the user can also change the severity of the alert there, e.g., from its current setting of "warning" to a new setting of "informational", "error", or "critical".

Figure 5:
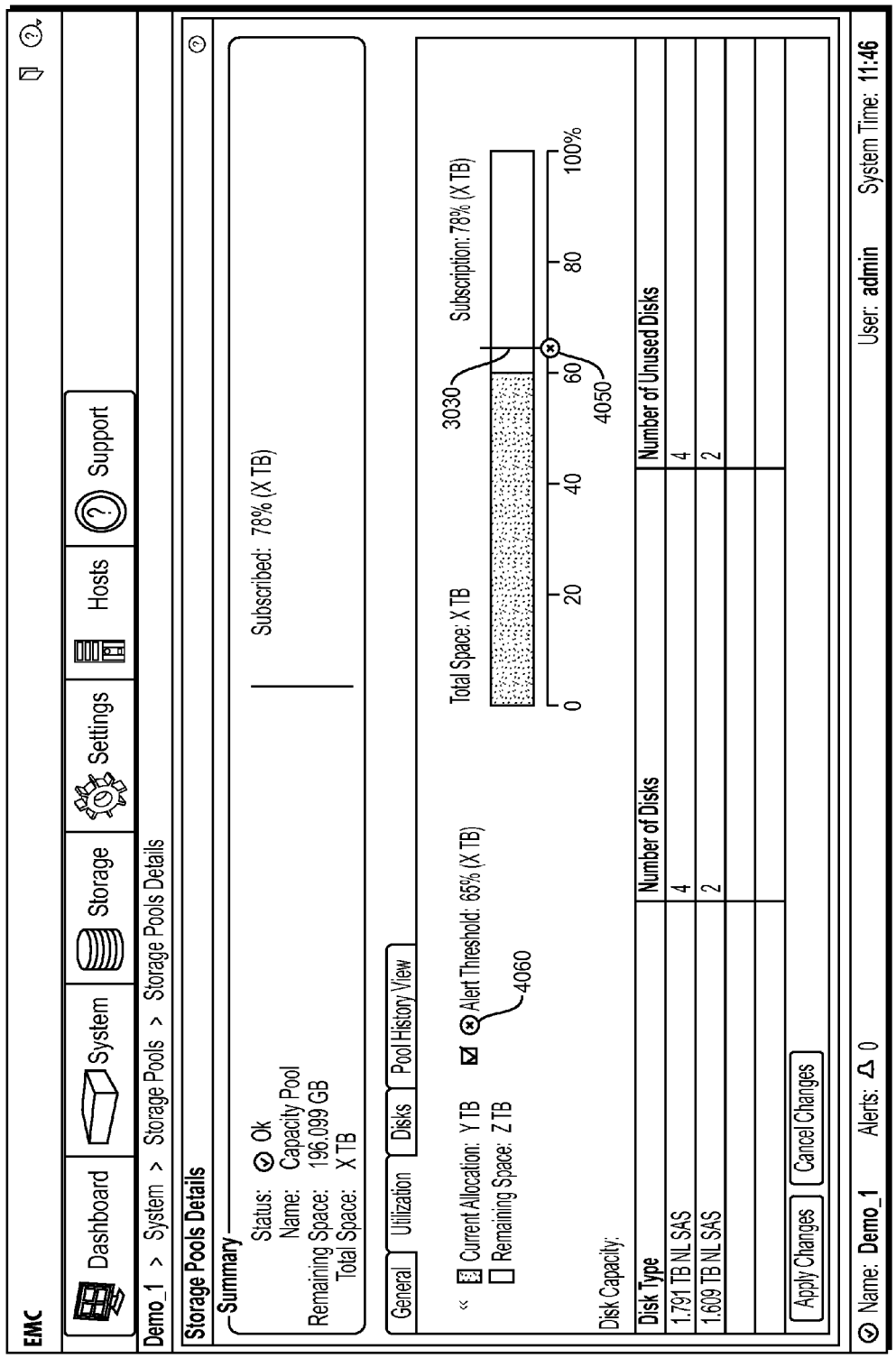

FIG. 5 illustrates that the user has selected the "critical" severity, has moved the cursor back to the thumb, which has now changed to a "critical" icon (this is also true of an icon 4060 in a legend area of the GUI), has slid the thumb to 65%, and has clicked an Apply button at the bottom of the GUI.

Figure 6:
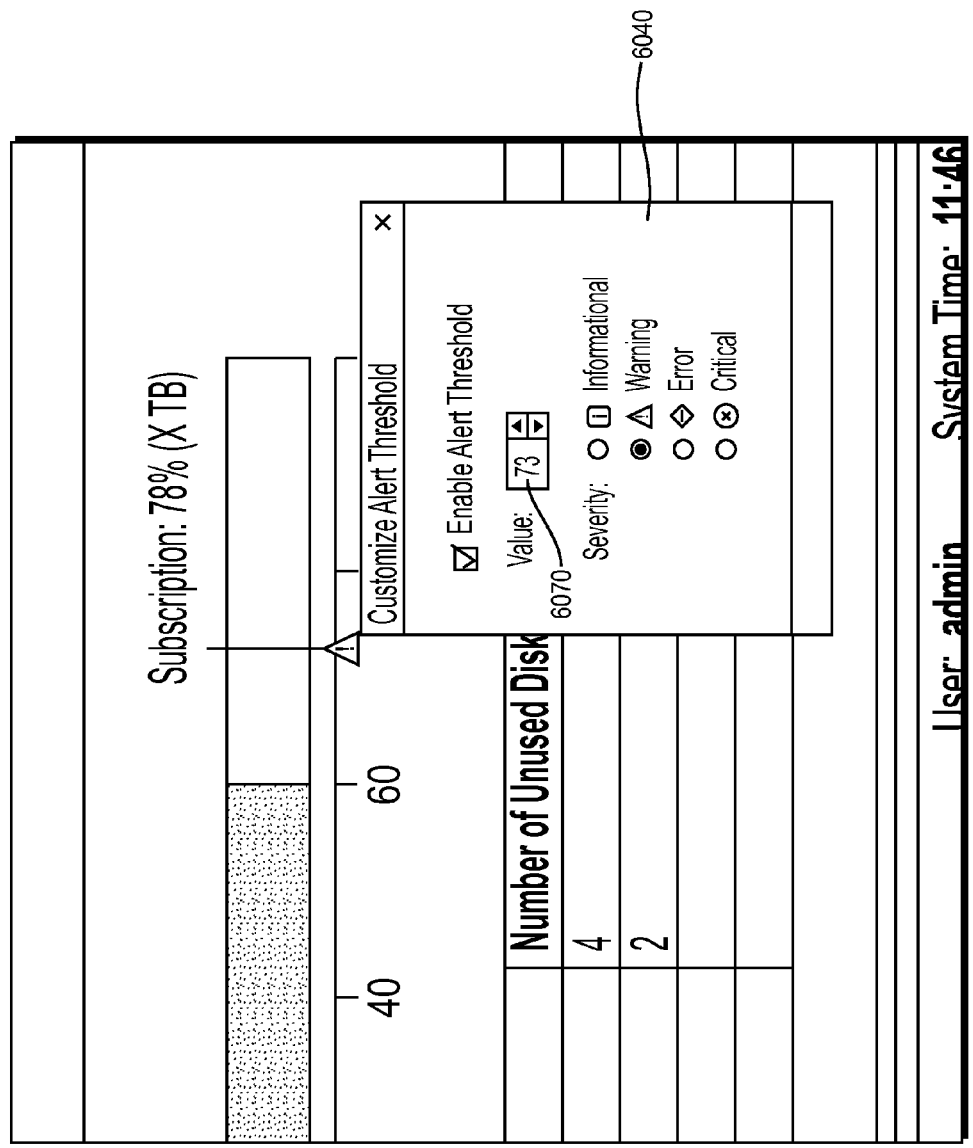

FIG. 6 illustrates an alternative integrated slider dialog 6040 that is a complex integrated slider dialog for choosing and displaying severity. The same steps and interactions described above for dialog 4040 may also be applied to dialog 6040, but use of dialog 6040 may also allow the GUI to be less cluttered elsewhere due to dialog 6040 providing a numerical input GUI element 6070 as an alternative to dragging the thumb to set the alert threshold (e.g., to 73%). For example, element 6070 may be, include, or be included in a list box, a drop down list, or a combo box.

At least one implementation is based on ADOBE® FLEX® software, wherein hover pop up required behavior is:

The pop up appears when the user mouses over (and leaves the cursor on) the thumb.

The popup closes if the user removes the cursor from the popup.

The pop up remains open when the user leaves the cursor anywhere inside its boundaries. The user interacts with controls inside the popup.

This behavior may be implemented as follows:

Start the timer on mouseout from the trigger component (the thumb), cancel it on mouseover in the popup, and call the close method affirmatively on mouseout from the popup.

Add this if condition to the popup window (without using Timers): if (!caption.hitTestPoint(stage.mouseX,stage.mouseY,true)) {PopUpManager.removePopUp(caption);}

In addition to either method above, if the user changed values (such as severity) inside the popup dialog and then moved the cursor outside the dialog (mouseout), those values are saved. The thumb image on the scale are also replaced by the icon of the newly chosen severity.

While the invention has been disclosed in connection with preferred embodiments shown and described in detail, their modifications and improvements thereon will become readily apparent to those skilled in the art. For example, the technique described herein may be applied to any computer system. Accordingly, the spirit and scope of the present invention should be limited only by the following claims.

What is claimed is:

1. A method for use in managing alert thresholds, the method comprising:

providing a graphical user interface (GUI) comprising a utilization bar associated with allocation of data storage in a data storage system, wherein the utilization bar includes an alert threshold slider comprising an integrated warning thumb, and wherein the utilization bar comprises a current data storage allocation area and a remaining unallocated data storage space area in the data storage system;

displaying an existing setting for a severity setting of an alert threshold, wherein the existing setting for the severity setting is an icon displayed integrally with the integrated warning thumb, wherein the icon is selected from among a plurality of different graphical severity indicators, and wherein the alert threshold slider indicates the alert threshold; and allowing a user to view and change the existing setting for the severity setting of the alert threshold using an integrated slider setting dialog pop-up, wherein the integrated slider setting dialog pop-up pops-up and is displayed next to the icon of the integrated warning thumb by hovering over the integrated warning thumb portion of the alert threshold slider, wherein the integrated slider setting dialog pop-up includes the plurality of graphical severity indicators, a numerical input GUI element for setting the alert threshold to a numerical value, and an alert threshold check box, wherein each of the plurality of different graphical severity indicators is associated with a respective particular severity setting, and wherein the severity setting is user selectable and the existing setting for the severity setting is the icon of the plurality graphical severity indicators currently selected by the user via the integrated slider setting dialog pop-up.

2. The method of claim 1, wherein the utilization bar has multiple integrated warning thumbs to allow the user to visually determine the severity setting for multiple thresholds.

3. The method of claim 1, wherein the integrated slider settings dialog pop-up uses hover interactions to make the integrated slider settings dialog pop-up close.

4. The method of claim 1, wherein when the user has the alert threshold configured and the current data storage allocation area reaches an alert threshold value, the user receives an email warning.

5. The method of claim 1, wherein when the user acts to change the alert threshold so that the user will receive a warning alert when the current data storage allocation area reaches a different value.

6. The method of claim 1, wherein when the user acts to change the alert threshold so that the user will receive a warning alert when the current data storage allocation area reaches a different value, and the user hovers a cursor over the integrated warning thumb, the user is made aware that the user can also change the severity setting of the alert threshold.

7. The method of claim 1, wherein when the user acts to change the alert threshold so that the user will receive a warning alert when the current data storage allocation area reaches a different value, and the user hovers a cursor over the integrated warning thumb, the user can also change the severity setting of the alert threshold to any of several different settings.

8. The method of claim 1, wherein after the user has slid the alert threshold slider to a different threshold value, the user can apply the different threshold value by clicking a button.

9. The method of claim 1, wherein the numerical input GUI element is for setting the alert threshold.

10. A system for use in managing alert thresholds, the system comprising a processor configured to:

provide a utilization bar associated with allocation of data storage in a data storage system, wherein the utilization bar includes an alert threshold slider comprising an integrated warning thumb, and wherein the utilization bar comprises a current data storage allocation area and a remaining unallocated data storage space area in the data storage system;

display an existing setting for a severity setting of an alert threshold, wherein the existing setting for the severity setting is an icon displayed integrally with the integrated warning thumb, wherein the icon is selected from among a plurality of different graphical severity indicators, and wherein the alert threshold slider indicates the alert threshold; and allow a user to view and change the existing setting for the severity setting of the alert threshold using an integrated slider setting dialog pop-up, wherein the integrated slider setting dialog pop-up pops-up and is displayed next to the icon of the integrated warning thumb by hovering over the integrated warning thumb portion of the alert threshold slider, wherein the integrated slider setting dialog pop-up includes the plurality of graphical severity indicators, a numerical input GUI element for setting the alert threshold to a numerical value, and an alert threshold check box, wherein each of the plurality of different graphical severity indicators is associated with a respective particular severity setting, and wherein the severity setting is user selectable and the existing setting for the severity setting is the icon of the plurality graphical severity indicators currently selected by the user via the integrated slider setting dialog pop-up.

11. The system of claim 10, wherein the utilization bar has multiple integrated warning thumbs to allow the user to visually determine the severity setting for multiple thresholds.

12. The system of claim 10, wherein the integrated slider settings dialog pop-up uses hover interactions to make the integrated slider settings dialog pop-up close.

13. The system of claim 10, wherein when the user has the alert threshold configured and the current data storage allocation area reaches an alert threshold value, the user receives an email warning.

14. The system of claim 10, wherein when the user acts to change the alert threshold so that the user will receive a warning alert when the current data storage allocation area reaches a different value.

15. The system of claim 10, wherein when the user acts to change the alert threshold so that the user will receive a warning alert when the current data storage allocation area reaches a different value, and the user hovers a cursor over the integrated warning thumb, the user is made aware that the user can also change the severity setting of the alert threshold.

16. The system of claim 10, wherein when the user acts to change the alert threshold so that the user will receive a warning alert when the current data storage allocation area reaches a different value, and the user hovers a cursor over the integrated warning thumb, the user can also change the severity setting of the alert threshold to any of several different settings.

17. The system of claim 10, wherein after the user has slid the alert threshold slider to a different threshold value, the user can apply the different threshold value by clicking a button.

18. The system of claim 10, wherein the numerical input GUI element is for setting the alert threshold.

* * * * *